UNITED STATES PATENT OFFICE.

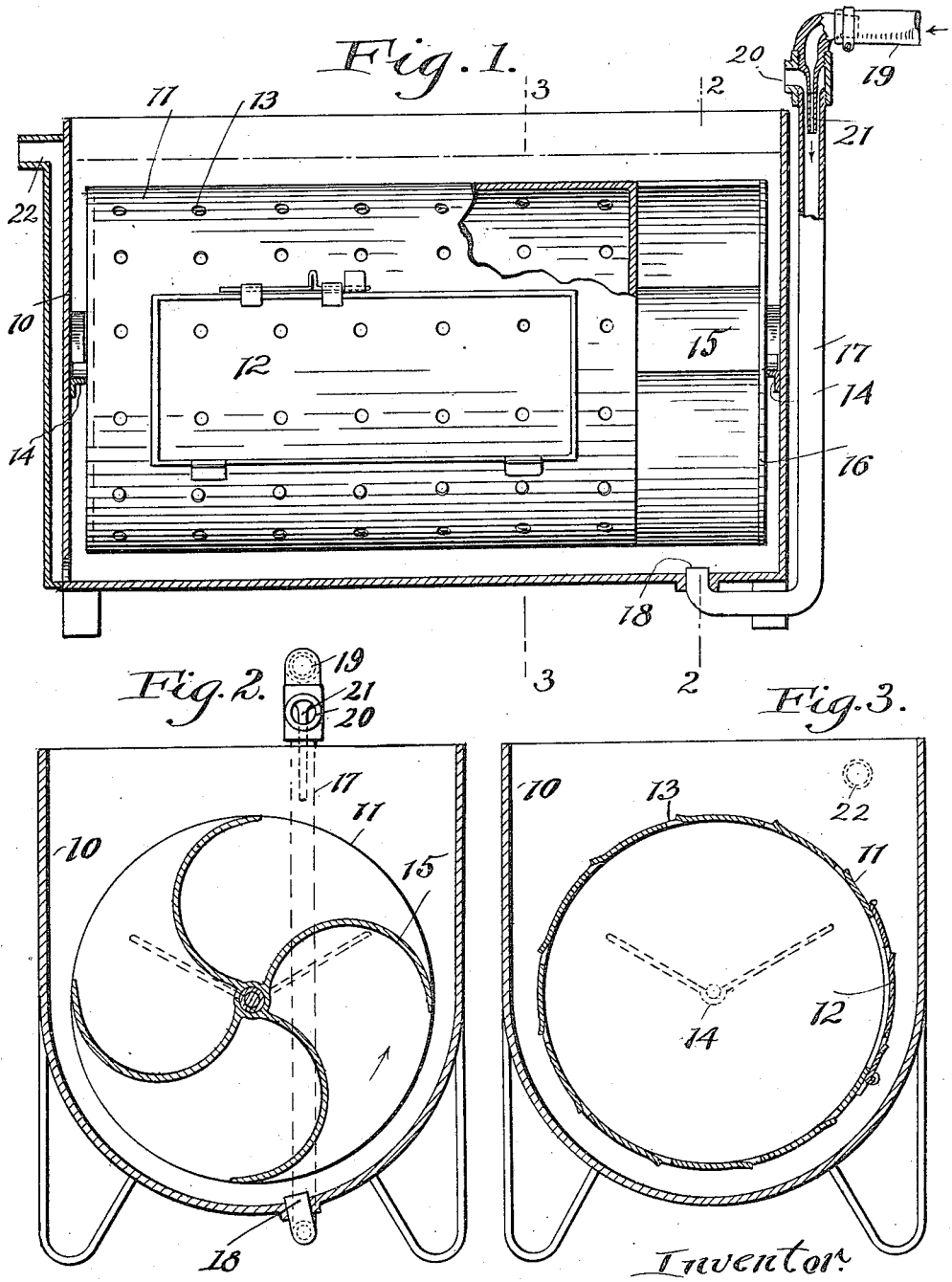

JOHN O. SCHMITT, OF CLEVELAND, OHIO.

PRINT-WASHER.

1,265,390.  Specification of Letters Patent.  Patented May 7, 1918.

Application filed March 9, 1917. Serial No. 153,564.

*To all whom it may concern:*

Be it known that I, JOHN O. SCHMITT, a citizen of the United States, residing at Cleveland, in the county of Cuyahoga and State of Ohio, have invented a certain new and useful Improvement in Print-Washers, of which the following is a full, clear, and exact description.

This invention relates to a washer such as are used by photographers for washing photographic prints. The invention relates more particularly to a print washer wherein the prints are inclosed in a perforated drum which in turn is rotatably supported in a casing to which water is supplied for the purpose of slowly rotating the drum and causing a circulation of water through the drum.

The principal object of the present invention is to provide a print washer of the rotating drum type, which requires a smaller quantity and less pressure of water than has been required by the prior devices to rotate the drum and effect the washing operation.

The invention may be briefly summarized as consisting in certain novel details of construction and combinations and arrangements of parts which will be described in the specification and set forth in the appended claims.

In the accompanying sheet of drawings, Figure 1 is a vertical sectional elevation through a print washer constructed in accordance with my invention; Fig. 2 is a transverse vertical sectional view substantially along the line 2—2 of Fig. 1; and Fig. 3 is a similar view substantially along the line 3—3 of Fig. 1.

The print washer constructed in accordance with my invention includes a tank 10, which is open at the top and may be semi-cylindrical at the bottom, as shown particularly in the transverse sectional views. Rotatably supported in this tank is a horizontal cylindrical drum 11 which is adapted to contain the prints to be washed. For the purpose of permitting the insertion and removal of the prints the drum is provided with a door 12, which may be a hinged door. In order that water may be readily circulated through the drum so that the prints contained in the drum will be effectively washed, the cylindrical wall of the drum is provided with a plurality of perforations 13, and if desired to promote the circulation of water, one side of each circular opening may be somewhat depressed and the other side somewhat elevated, the elevated portion pointing in the direction that the drum is to be rotated, as shown in Fig. 3. This feature, however, is not essential to my invention.

The drum is removably seated in the tank and is supported from the ends of the latter by studs which project from the ends of the drum and engage flanges 14 on the ends of the tank. The flange at each end of the tank may taper or incline downwardly toward the center thereof to form a seat or bearing for the coöperating stud. This feature is likewise not essential to my invention as the drum may be rotatably supported in any other suitable manner.

At one end of the drum a series of vanes 15, of what may be termed an air wheel, are provided, these vanes preferably being curved substantially as shown in Fig. 2, and being located between one end of the drum and a disk 16 which is spaced from said end of the drum a suitable distance as shown in Fig. 1. These vanes, as before stated, form what may be termed an air wheel and constitute pockets which receive air admitted with water which is supplied to the bottom of the tank beneath the vanes, the air and water being supplied by a pipe or conduit 17 which extends downwardly along one end of the drum to the bottom and opens into the tank beneath the vanes at one side of the longitudinal axis of the drum, as shown at 18. To this pipe 17 there is adapted to be connected a tube or pipe 19 which is generally a flexible tube designed to be connected to any suitable source of water supply. Additionally there is provided an air intake opening 20 near the top of the pipe 17, and opposite this air intake opening the pipe 17 is provided on the interior thereof with an injector-like down-turned nozzle 21, the construction being such that water passing downwardly through the pipe 17 draws or sucks in air at the air inlet opening 20, which air is carried downwardly with the water and enters the tank at the discharge opening 18 just beneath the vanes. The air rising in the tank is caught in the curved vanes 15 and as the discharge opening 18 is located somewhat to one side of the center of rotation of the air wheel, the effect of the rising air is to pass upwardly along one side of the air wheel and to rotate the drum in the direction indicated by the arrow in Fig. 2.

Thus the drum is rotated solely by the action of the rising air and not by the force of the water which is supplied under very low pressure or velocity, and at a slow rate, a very small flow of water being required to cause the drum to rotate at the desired rate. The water serves merely as a carrier for the air, and for the purpose of washing the prints in the drum, the water eventually leaving the drum through a suitable outlet opening 22.

Heretofore in a print washer of the rotary drum type, the drum has been rotated by the impact of the water on the vanes of a water wheel, but in such constructions water is of necessity supplied at a considerable velocity and in a fairly large quantity. In this respect my invention has a very distinct advantage over prior constructions, for with my construction the water is supplied in a small quantity and at a slow velocity, only enough water being supplied to effectively wash the prints, and not an excess of water as has been required heretofore. Additionally the print washer embodying my invention is silent in action in view of the low velocity at which the water is supplied.

While my invention is adapted particularly for washing photographic prints, it may be employed to advantage for washing articles other than prints. I therefore do not desire to be confined to the particular adaptation or purpose of the invention herein described.

Having thus described my invention, what I claim, is:

1. In a machine of the character described, a tank, a drum rotatably supported in the tank, an air-wheel rotatable about a substantially horizontal axis and connected with the drum so as to rotate the same, and means whereby water and air are supplied to the tank beneath the air-wheel so that the air rising will rotate the same and the drum.

2. In a washer of the character described, a tank, a drum rotatably supported in the tank and having openings through which water may pass, means for supplying water and air to the tank, an air-wheel connected to the drum and adapted to rotate about a substantially horizontal axis, said wheel being located above the point of supply of the water and air so that the air rising will rotate the air-wheel and the drum.

3. In a machine of the character described, a tank, a substantially horizontal drum rotatably supported in the tank and provided with openings through which water may circulate, an air wheel at one end of the drum, and means for supplying water and air to the tank beneath the air-wheel so that the air rising through the water to the top of the tank will rotate the wheel and the drum.

4. In a device of the character described, a water tank, a drum extending horizontally therethrough and rotatably supported therein said drum having perforations through which water may circulate, an air-wheel connected to the drum so as to rotate the same; and a water supply pipe connected to the bottom of the tank and having a discharge opening beneath the air-wheel, said pipe having an injector-like nozzle, and an air inlet opening adjacent the nozzle.

5. In a device of the character described, a water tank, a drum extending horizontally therethrough and rotatably supported therein, said drum having perforations through which water may circulate, an air-wheel carried by the drum and a water supply pipe connected to the tank and having a discharge opening beneath the air-wheel, said pipe having an injector-like nozzle and an air inlet opening, the discharge opening of the supply pipe being at one side of the longitudinal axis of the drum.

In testimony whereof, I hereunto affix my signature.

JOHN O. SCHMITT.

Copies of this patent may be obtained for five cents each, by addressing the "Commissioner of Patents, Washington, D. C."